March 23, 1943. E. M. WORDEN 2,314,535
CUTTING MACHINE
Filed Aug. 16, 1941 3 Sheets-Sheet 1

Inventor
EDWARD M. WORDEN.
By Frank Fraser
Attorney

March 23, 1943.  E. M. WORDEN  2,314,535
CUTTING MACHINE
Filed Aug. 16, 1941  3 Sheets-Sheet 3
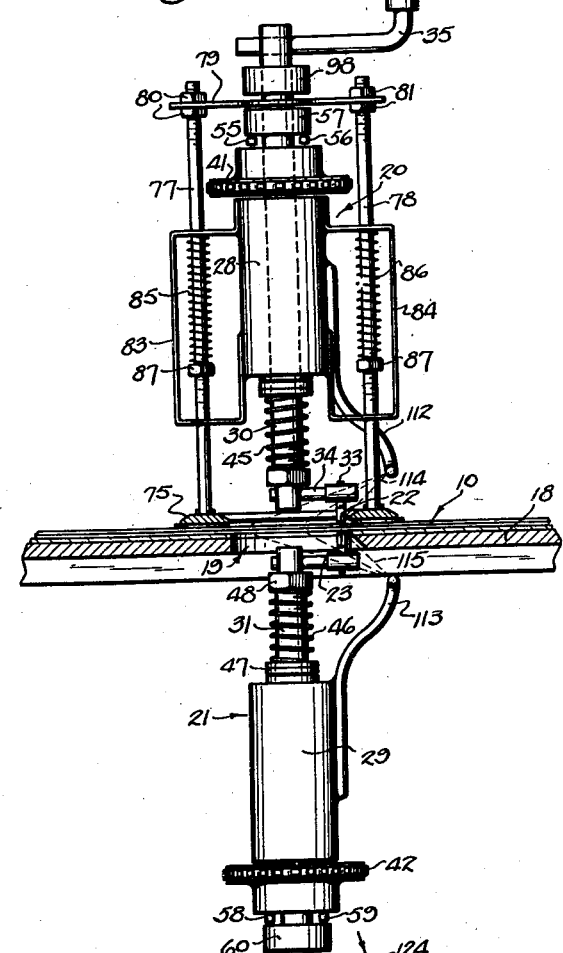
Fig. 3.
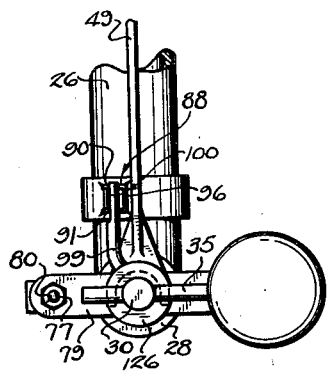
Fig. 4.
Fig. 5.
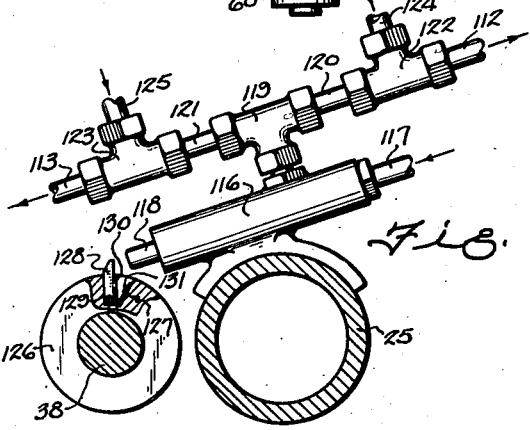
Fig. 6.
Inventor
EDWARD M. WORDEN.
By Frank Fraser
Attorney Patented Mar. 23, 1943

2,314,535

UNITED STATES PATENT OFFICE 2,314,535

CUTTING MACHINE

Edward M. Worden, Toledo, Ohio, assignor to Libbey-Owens-Ford Glass Company, Toledo, Ohio, a corporation of Ohio Application August 16, 1941, Serial No. 407,227

16 Claims. (Cl. 33—27)

The present invention relates to cutting machines in general and more particularly to a machine for cutting glass sheets or plates.

This invention is of especial utility in the cutting of circular discs from flat sheets or plates of laminated safety glass comprising two sheets of glass bonded to one another by an interposed layer of plastic material to form a composite structure. It has been customary, in cutting laminated safety glass, to first score one of the glass sheets and crack the same along the score line, after which the second glass sheet is scored along a line directly opposite the first score line and said second sheet then cracked along its score line. The glass is then separated along the lines of cut by stretching the plastic interlayer and the plastic finally severed by means of a razor blade or other sharp implement.

It is the primary aim of this invention to provide a machine of improved construction, combination, and arrangement for cutting out circular discs from sheets or plates of laminated safety glass more rapidly, accurately, and economically than in the past, and for obtaining the maximum number of discs with the least possible waste from the sheets or plates.

Another important object of the invention is to provide a cutting machine of the above character embodying novel mechanism by which the sheet of laminated safety glass can be simultaneously cut along two parallel, oppositely disposed lines on opposite sides respectively of the composite sheet whereby both glass sheets can be cut in a single operation.

Another important object of the invention is to provide a cutting machine of the above character embodying upper and lower cutting tools for scoring the outer surfaces of the two sheets of glass, combined with novel mechanism for connecting said cutting units together so that they operate in unison to insure the score lines on the two glass sheets being directly opposite and in alignment with one another.

Another important object of the invention is to provide a cutting machine of the above character embodying novel means under the control of an operator for moving the upper and lower cutting tools away from one another to facilitate the positioning of the composite sheet therebetween and its removal therefrom, coupled with means for automatically returning the cutting tools to cutting position upon the release of the first-named means by the operator.

A further important object of the invention is to provide a cutting machine of the above character embodying novel means serving as a positive stop for limiting the cutting movement of the cutting tools to prevent overlapping of the score lines at the end of the cutting operation and possible spoiling of the cut.

A further important object of the invention is to provide a cutting machine of the above character including novel means for effecting an automatic oiling of the cutting tools at the beginning of each cutting operation.

A still further important object of the invention is to provide a cutting machine of the above character embodying novel means under the control of the operator and operable in conjunction with the cutting tools for firmly clamping the sheets in place during cutting.

Other objects and advantages of the invention will become more apparent during the course of the following description when taken in connection with the accompanying drawings.

In the drawings wherein like numerals are employed to designate like parts throughout the same:

Fig. 3 is a vertical longitudinal section taken substantially on line 3—3 of Fig. 2;

Fig. 4 is a plan view looking down on top of the upper cutting unit;

Fig. 5 is a detail vertical section taken substantially on line 5—5 of Fig. 1;

Fig. 6 is a detail section of the oiling means for the cutting tools taken substantially on line 6—6 of Fig. 1; and Fig. 7 is a transverse section through a sheet of laminated safety glass showing the manner in which it is scored.

Figure 1:
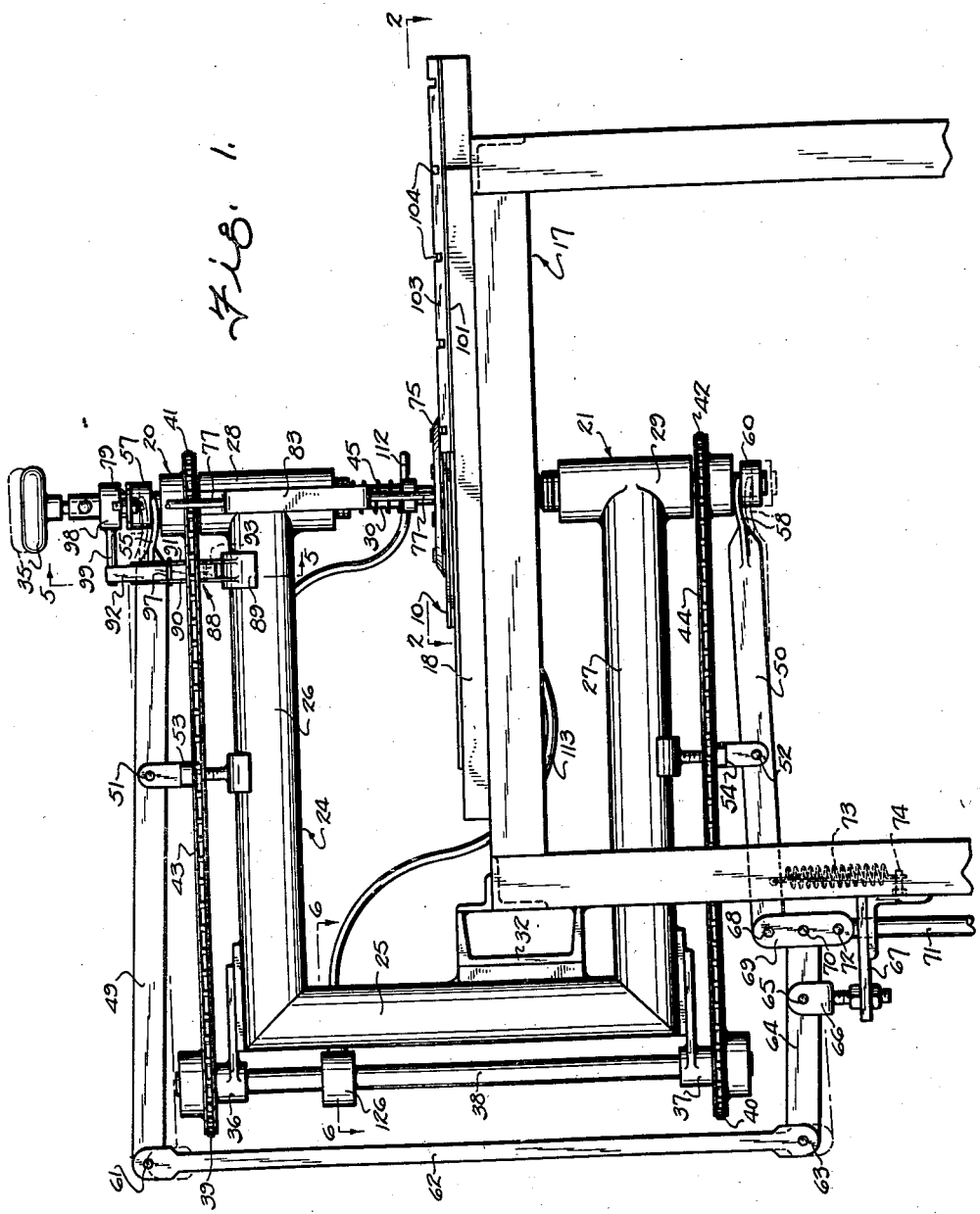
Fig. 1 is a side elevation of a cutting machine constructed in accordance with the present invention.
Figure 2:
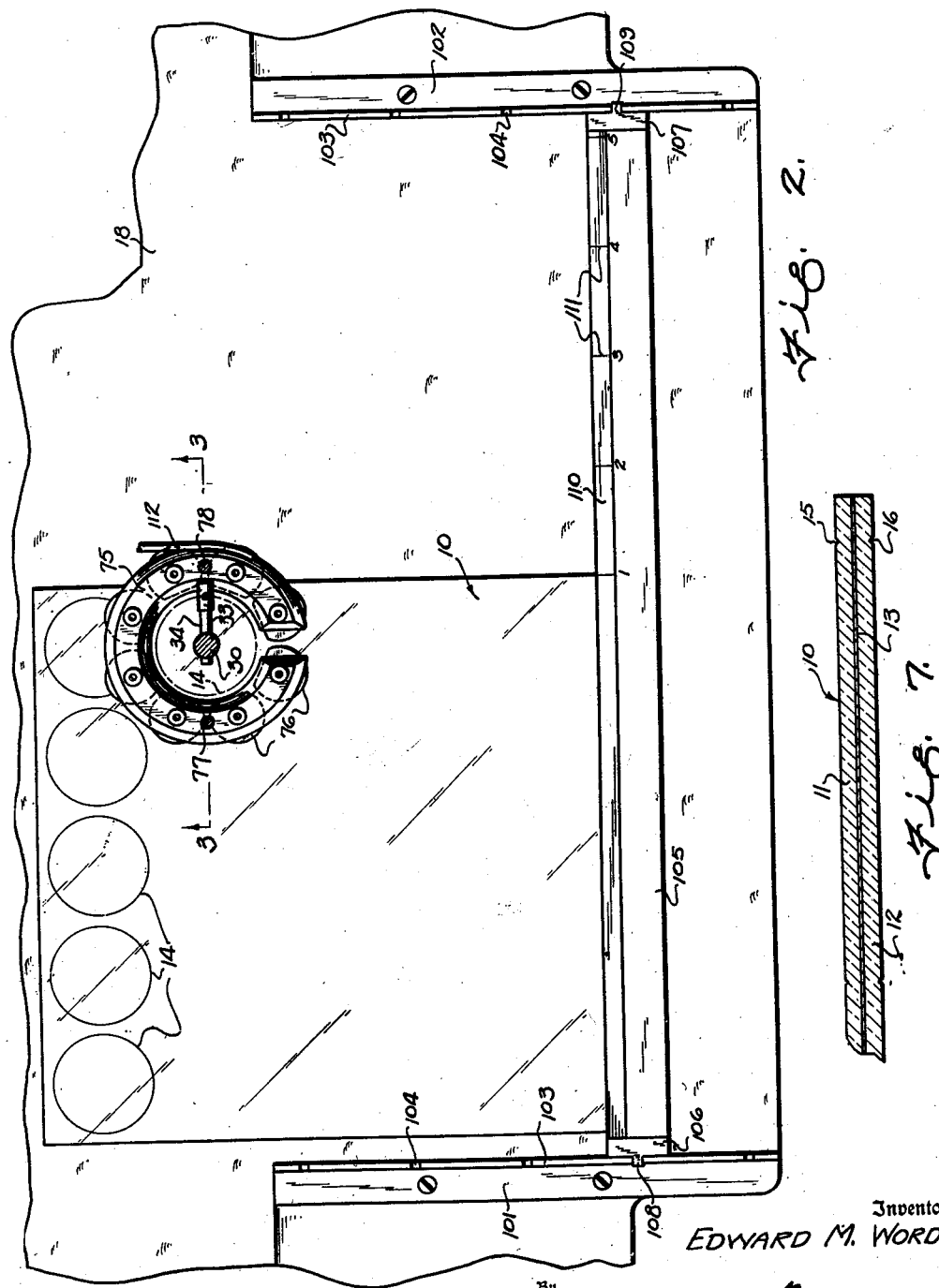
Fig. 2 is a plan view of the cutting table and means for clamping the sheets in place thereupon, taken substantially on line 2—2 of Fig. 1.

In Fig. 7 is shown a sheet of laminated safety glass 10 comprising the two sheets of glass 11 and 12 having interposed therebetween a sheet 13 of plastic material bonded to the glass sheets to produce a unitary structure. As illustrated in Fig. 2, the present invention contemplates the provision of a machine for cutting out circular discs 14 from the sheet of laminated safety glass 10. This is accomplished by scoring the outer surfaces of the two sheets of glass 11 and 12 along oppositely disposed, parallel lines 15 and 16 by a single cutting operation, after which the glass sheets can be broken along the score lines and the plastic interlayer severed to remove the discs.

The cutting machine herein provided comprises a cutting table including a suitable supporting framework 17 and a horizontal top 18 upon which the sheet of safety glass 10 is horizontally supported during cutting. The top 18 of the table is provided substantially centrally thereof with a circular opening 19 and mounted above and beneath the table top in line with said opening are the cutting units 20 and 21 including the cutting tools 22 and 23 respectively, preferably in the form of freely rotatable steel wheels.

The cutting units 20 and 21 are carried by a substantially C-shaped supporting member 24 comprising a vertical portion 25 and forwardly directed horizontal upper and lower arms 26 and 27 disposed respectively above and beneath the top 18 of the cutting table. The horizontal arms 26 and 27 are provided at their outer ends with the vertical cylindrical bearings 28 and 29 within which are slidably and rotatably mounted the shafts 30 and 31 respectively carrying the cutting tools 22 and 23. The vertical portion 25 of supporting member 24 is welded or otherwise suitably secured to a channel beam 32 fixed to the supporting framework 17 of the cutting table.

Each of the cutting tools 22 and 23 is carried by a holder 33 secured to a substantially horizontal rod 34 passing through an opening in the respective shaft 30 or 31 and suitably secured thereto so that upon rotation of the shaft, the cutting tool will be swung through a complete circle. By adjusting the cutter holder 33 along rod 34, discs of different sizes can be cut. The cutter shaft 30 extends upwardly through the bearing 28 and has secured to its upper end a handle 35 to facilitate rotation of said shaft by the operator.

The two cutting tools 22 and 23 are adapted to be operated in unison and for this purpose the shafts 30 and 31 are connected together so that they are rotated simultaneously upon turning of the handle 35. To this end, there is carried by the supporting member 24, the vertically aligned bearings 36 and 37 within which is journaled a vertical shaft 38 having fixed to its upper and lower ends the sprockets 39 and 40. Slidably keyed to the shafts 30 and 31, outwardly of the bearings 28 and 29, are sprockets 41 and 42 respectively, and trained about these sprockets are sprocket chains 43 and 44 also trained about the sprockets 39 and 40 respectively. With this construction, it will be seen that the shafts 30 and 31 are operatively connected together so that upon turning of shaft 30, the shaft 31 will be rotated simultaneously therewith. As a result, the cutting tools 22 and 23 will be operated as a unit to simultaneously score the two sheets of glass along lines directly opposite one another.

The cutting tools 22 and 23 are normally urged toward one another into engagement with the sheet of laminated safety glass 10 by compression springs 45 and 46 encircling the shafts 30 and 31 inwardly of bearings 28 and 29, each of said springs bearing at its outer end against a fixed collar 47 carried by the respective bearing and at its inner end against a nut 48 threaded upon the respective shaft.

To facilitate the initial postioning of the sheet of safety glass upon the cutting table preparatory to cutting as well as its movement upon the table between successive cutting operations and its subsequent removal therefrom, means is provided under the control of an operator for moving the cutting tools 22 and 23 simultaneously away from one another and out of contact with the sheet as desired. Such means comprises the upper and lower substantially horizontal levers 49 and 50 pivoted intermediate their ends as at 51 and 52 to brackets 53 and 54 secured to the upper and lower horizontal arms 26 and 27 respectively of the supporting member 24. The forward end of lever 49 is bifurcated to provide the spaced legs 55 and 56 which straddle the shaft 30 of upper cutting unit 20, as best shown in Fig. 3, and are disposed between the sprocket 41 and a collar 57 fixed to said shaft. The forward end of lever 50 is also bifurcated to provide the spaced legs 58 and 59 which straddle the shaft 31 of the lower cutting unit 21 and are disposed between the sprocket 42 and a collar 60 fixed to the outer end of said shaft.

Pivoted to the outer end of lever 49, as at 61, is a vertical connecting rod 62 to the lower end of which is pivoted, as at 63, one end of a relatively short, substantially horizontal lever 64 pivotally mounted intermediate its ends, as at 65, to a bracket 66 carried by a plate 67 attached to the supporting frame 17 of the cutting table. Pivoted to the outer end of lever 50, as at 68, is a vertical link 69 to which the forward end of lever 64 is also pivoted as at 70. The numeral 71 designates a vertical actuating rod pivoted at its upper end, as at 72, to the link 69 and having associated with its lower end (not shown) a suitable pivoted foot pedal which is so arranged that it can be readily actuated by the operator. The foot pedal is of such construction that upon pressing downwardly thereupon, the actuating rod 71 will be forced upwardly to swing the lever 50 in a clockwise direction about pivot point 52, whereupon the legs 58 and 59 thereof engaging collar 60 will move the shaft 31 outwardly and the cutting tool 23 from contact with the sheet 10. Simultaneously, the lever 49 will be swung about pivot point 51 in a counter-clockwise direction through the lever 64 and connecting rod 62 so that the legs 55 and 56 of said lever engaging collar 57 will move shaft 30 outwardly to disengage the cutting tool 22 from the sheet. In other words, upon upward movement of the actuating rod 71, the two cutting tools 22 and 23 will be simultaneously moved away from one another and out of contact with the laminated sheet to permit removal, replacement, or relocation thereof upon the table. Upon release of the actuating rod 71, the cutting tools will be automatically returned to cutting position by the action of the springs 45 and 46.

A tension spring 73, secured at one end to the lever 50 and at its opposite end to a fixed screw 74, is provided to normally urge the actuating rod 71 downwardly upon the release thereof by the operator and thereby facilitate the return of the cutting tools to cutting position.

During the rotation of the shafts 30 and 31 to effect the scoring of the laminated sheet, it is of course essential that the sheet be held firmly upon the top of the cutting table to prevent accidental displacement thereof. For this purpose, there is provided a substantially circular clamping ring 75 surrounding the opening 19 in the top of the cutting table and carrying upon its undersurface a plurality of pads 76 which engage the upper surface of the laminated sheet 10. The clamping ring 75 is carried at the lower ends of a pair of diametrically opposed vertical rods 77 and 78 to the upper ends of which is secured a horizontal plate 79 by nuts 80 and 81 and having an opening therein through which the upper end of shaft 30 loosely passes. The rods 77 and 78 pass upwardly through substantially rectangular frames 83 and 84 respectively secured to the bearing 28. Encircling the rods 77 and 78 are compression springs 85 and 86 respectively, each of said springs bearing at its upper end against the top of the respective frame 83 or 84 and at its lower end against a nut 87 threaded upon the respective rod. The springs 85 and 86, therefore, serve to normally urge the clamping ring 75 downwardly to hold the pads 76 carried thereby in engagement with the laminated sheet.

When it is desired to position the composite sheet upon the cutting table or remove it therefrom, as well as relocate it between successive cutting operations, it is necessary for the clamping ring 75 to be moved upwardly to disengage the pads 76 from the sheet. In accordance with the invention, this raising of the clamping ring is accomplished simultaneously with the separating of the cutting tools 22 and 23 and in the same operation. Thus, when the operator forces the actuating rod 71 upwardly to move the cutting tools away from one another, the upward movement of shaft 30 will cause the collar 57 thereon to engage plate 79 and effect the raising of the rods 77 and 78 against the action of the springs 85 and 86 and thus move the clamping pads out of engagement with the sheet. Upon release of the actuating rod 71, the cutting tools will be automatically returned to cutting position as explained above, and simultaneously the action of the springs 85 and 86 will automatically cause a lowering of the clamping ring 75 to again bring the pads 76 into glass clamping engagement.

In order to minimize the danger of spoiling the cut and also to facilitate an even, uniform break along the score lines, it is desirable, in cutting out circular discs, that the score lines do not overlap one another; that is to say, that the cutting tools are not permitted to rotate more than 360 degrees so that at the completion of the cutting operation, the ends of the score lines will not overlap the forward ends thereof. Means is therefore provided which serves as a positive stop to effectively prevent further rotation of the shafts 30 and 31 after the cutting tools 22 and 23 have been rotated 360 degrees. Such means comprises a substantially vertical channel member 88 integral with an arcuately curved shoe 89 fixed to the horizontal arm 26 of the supporting member 24. Arranged between the opposite side walls 90 and 91 of channel member 88 is a substantially vertical stop strip 92 pivoted at its lower end as at 93 and having its upper end beveled as at 94. The stop strip 92 is normally urged outwardly about its pivot 93 by means of a leaf spring 95 fixed to the back wall 96 of said channel member 88, the outward movement of said strip being limited by a stop 97.

Keyed to the upper end of the shaft 30 of cutting unit 20 is a collar 98 provided with a horizontal pin 99, the outer end portion of which is formed with an angled flat face 100. At the beginning of the cutting operation, the stop strip 92 and cooperating pin 99 are in the positions indicated in full lines in Fig. 5. The operator then rotates shafts 30 and 31 by means of hand wheel 35 to cause the cutting tools 22 and 23 to move through circular paths. When the cutting tools have been rotated 360 degrees, the pin 99 engages the outer flat face of the stop strip 92 as indicated at $a$ in Fig. 5, and continued movement will cause said strip to be forced rearwardly to the position shown in broken lines, whereupon further movement of the strip as well as the pin 99 will be prevented. In this way, further rotation of the cutting tools is effectively prevented after they have made a complete circle.

After the cuts have been made, the cutting tools are moved away from one another and the clamping ring 75 simultaneously raised as above described so that the sheet can be relocated upon the table or removed therefrom. Upon separating of the cutting tools and the raising of the clamping ring, the collar 98 will be moved upwardly with the shaft 30 and the pin 99 moved above the stop strip 92 to the position indicated at $b$ in Fig. 5. When this is done, the spring 95 will urge the stop strip forwardly from its broken line position to its full line position so that when the cutting tools are again brought into cutting position, the pin 99 will be lowered to the full line position shown in Fig. 5 whereupon the machine is ready for making another cut.

In cutting out a plurality of the discs 14 from the laminated sheet 10, it is of course necessary, after each cutting operation, to move the sheet longitudinally upon the table until the maximum number of discs are cut from the sheet, whereupon the sheet is then moved rearwardly to permit the cutting of another row of discs. To facilitate the accurate positioning of the sheet by the operator whereby to permit the maximum number of discs to be cut therefrom with the least possible waste, there is carried along opposite ends of the table top 18 the spaced parallel guides 101 and 102, each being provided with a vertical side wall 103 having vertical slots 104 in the upper edge thereof spaced from one another a distance slightly greater than the diameter of the discs to be cut. Extending longitudinally of the table between the guides 101 and 102 is a straight edge 105 provided at its opposite ends with cap members 106 and 107 having projections 108 and 109 which snugly fit the slots 104 in guides 101 and 102. The straight edge 105 is provided with a scale plate 110 graduated as at 111, and these graduations may be numbered "1," "2," "3," "4," "5," etc., if desired, to indicate the successive positions in which the laminated sheet is to be placed, the distance between each graduation 111 being also slightly greater than the diameter of the discs 14.

In the position shown in Fig. 2, one complete row of discs 14 has been cut and the laminated sheet 10 is in its furthermost position to the left of the table, with the right hand edge thereof in alignment with graduation "1" for cutting the first disc. After the first disc has been cut, the laminated sheet is moved to the right to align with graduation "2" and another disc cut, and so on until all five discs have been cut. The straight edge 105 is then lifted and moved rearwardly to engage the next set of grooves 104 in guides 101 and 102, and the operation above described is repeated to cut out another row of discs. This operation is continued until the maximum number of rows of discs have been cut from the laminated sheet. Obviously, the discs may be of any desired size, with the number thereof cut from the laminated sheet depending upon the size of the disc and sheet.

The machine further embodies means for oiling the cutting tools 22 and 23 at the beginning of each cutting operation to facilitate the cutting action thereof. To this end, there are provided the two oil supply pipes 112 and 113 arranged above and beneath the table top 18 and having openings therein adjacent their outer ends through which oil can be sprayed upon the cutting tools as indicated by the broken lines 114 and 115 in Fig. 3. As best shown in Fig. 6, there is carried by the vertical portion 25 of supporting member 24 a valve 116 and communicating with one end thereof is a pipe 117 for supplying compressed air, while associated with the opposite end is a plunger 118 normally urged outwardly to maintain the valve closed. Also carried by the valve 116 is a T-coupling 119 within the opposite ends of which are threaded pipes 120 and 121 to which are secured T-couplings 122 and 123 respectively. The inner ends of the oil pipes 112 and 113 are secured within the outer ends of the T-couplings 122 and 123, while also associated with the couplings 122 and 123 are oil supply pipes 124 and 125 respectively. With this arrangement, it will be apparent that when the plunger 118 is forced inwardly, the valve 116 is opened whereby compressed air will enter through pipe 117 and pass through couplings 119 and 122 and 123 to the oil pipes 112 and 113, the air pressure serving to eject the desired amount of oil from the pipes 112 and 113 to the cutting tools 22 and 23.

The valve 116 is adapted to be automatically opened at the beginning of each cutting operation, and to this end there is keyed to the vertical shaft 38 a collar 126 provided in the periphery thereof with a recess 127. Arranged within the recess 127 is a dog 128 pivoted at its inner end as at 129 and having its outer end projecting beyond said collar. Upon rotation of the shaft 38, the dog 128 is adapted to engage the outer end of plunger 118 and force the same rearwardly to momentarily open the valve 116 and thereby effect the oiling of the cutters. As soon as the dog 128 passes beyond plunger 118, the valve will be automatically closed. In order to permit the shaft 38 to be rotated in the reverse direction when it may be desired to make repairs on the machine or for any other purpose, there is also arranged within the recess 127 a V-shaped spring 130, one leg of which is secured within said recess as at 131 while the opposite leg bears against the dog 128 and normally maintains it in the position shown in Fig. 6. However, upon rotation of the shaft 38 in a counterclockwise direction as viewed in Fig. 6, the dog 128 will be permitted to move past the plunger 118 due to the provision of the spring 130.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a machine for cutting discs from sheets or plates of glass and the like, means for supporting the sheet to be cut in a horizontal position, cutting units mounted above and beneath said supporting means including cutting tools adapted to engage opposite surfaces of the sheet and disposed in vertical alignment with one another, means for rotating said cutting tools simultaneously through circular paths, and means for preventing the said cutting tools from being rotated more than 360 degrees.

2. In a machine for cutting discs from sheets or plates of glass and the like, means for supporting the sheet to be cut in a horizontal position, cutting units mounted above and beneath said supporting means including cutting tools adapted to engage opposite surfaces of the sheet and disposed in vertical alignment with one another, means for rotating said cutting tools simultaneously through circular paths, and means controlled by the rotation of the said cutting tools for directing oil thereupon.

3. In a machine for cutting discs from sheets or plates of glass and the like, means for supporting the sheet to be cut in a horizontal position, cutting units mounted above and beneath said supporting means including cutting tools adapted to engage opposite surfaces of the sheet, means connecting said cutting units together, means for rotating said cutting tools simultaneously through circular paths, and means for preventing the said cutting tools from being rotated more than 360 degrees.

4. In a machine for cutting discs from sheets or plates of glass and the like, means for supporting the sheet to be cut in a horizontal position, cutting units mounted above and beneath said supporting means including cutting tools adapted to engage opposite surfaces of the sheet, means connecting said cutting units together, means for rotating said cutting tools simultaneously through circular paths, and means actuated by the rotation of the said cutting tools for directing oil thereupon.

5. In a machine for cutting discs from sheets or plates of glass and the like, a table for horizontally supporting the sheet to be cut having an opening therein, cutting units mounted above and beneath said table including cutting tools disposed in vertical alignment with one another and also in line with said opening, and means for rotating said cutting tools simultaneously through circular paths.

6. In a machine for cutting discs from sheets or plates of glass and the like, a table for horizontally supporting the sheet to be cut having an opening therein, cutting units mounted above and beneath said table including cutting tools disposed in vertical alignment with one another and also in line with said opening, means for rotating said cutting tools simultaneously through circular paths, and means under the control of an operator for moving said cutting tools away from one another to permit the positioning of the sheet between the said cutting tools or its removal therefrom.

7. In a machine for cutting discs from sheets or plates of glass and the like, a table for horizontally supporting the sheet to be cut having an opening therein, cutting units mounted above and beneath said table including cutting tools disposed in vertical alignment with one another and also in line with said opening, means for rotating said cutting tools simultaneously through circular paths, and means for preventing the said cutting tools from being rotated more than 360 degrees.

8. In a machine for cutting discs from sheets or plates of glass and the like, a table for horizontally supporting the sheet to be cut having an opening therein, cutting units mounted above and beneath said table including cutting tools disposed in vertical alignment with one another and also in line with said opening, means for rotating said cutting tools simultaneously through circular paths, and means controlled by the rotation of the said cutting tools for directing oil thereupon.

9. In a machine for cutting discs from sheets or plates of glass and the like, a table for horizontally supporting the sheet to be cut having an opening therein, cutting units arranged above and beneath said table including vertically aligned shafts and cutting tools carried by said shafts and disposed in vertical alignment with one another and also in line with said opening, means connecting the cutting units together, and means for simultaneously rotating said shafts to move said cutting tools through circular paths.

10. In a machine for cutting discs from sheets or plates of glass and the like, a table for horizontally supporting the sheet to be cut having an opening therein, cutting units arranged above and beneath said table including vertically aligned shafts and cutting tools carried by said shafts and disposed in vertical alignment with one another and also in line with said opening, means connecting the cutting units together, means for simultaneously rotating said shafts to move said cutting tools through circular paths, and means under the control of an operator for moving said cutting tools away from one another to permit the positioning of the sheet between the said cutting tools or its removal therefrom.

11. In a machine for cutting discs from sheets or plates of glass and the like, means for supporting the sheet to be cut in a horizontal position, cutting units mounted above and beneath said supporting means including cutting tools adapted to engage opposite surfaces of the sheet and disposed in vertical alignment with one another, means for rotating said cutting tools simultaneously through circular paths, means for clamping the sheet in place upon said supporting means, means for moving said cutting tools away from one another to permit the positioning of the glass sheet between said cutting tools or its removal therefrom, and means controlled by movement of the said cutting tools away from one another for releasing the clamping means from the sheet.

12. In a machine for cutting discs from sheets or plates of glass and the like, means for supporting the sheet to be cut in a horizontal position, cutting units mounted above and beneath said supporting means including cutting tools adapted to engage opposite surfaces of the sheet, means connecting said cutting units together, means for rotating said cutting tools simultaneously through circular paths, means for clamping the sheet in place upon said supporting means, means for moving said cutting tools away from one another to permit the positioning of the glass sheet between said cutting tools or its removal therefrom, and means controlled by movement of the said cutting tools away from one another for releasing the clamping means from the sheet.

13. In a machine for cutting discs from sheets or plates of glass and the like, a table for horizontally supporting the sheet to be cut having an opening therein, cutting units mounted above and beneath said table including cutting tools disposed in vertical alignment with one another and also in line with said opening, means for rotating said cutting tools simultaneously through circular paths, means for clamping the sheet in place upon said table, means for moving said cutting tools away from one another to permit the positioning of the glass sheet between said cutting tools or its removal therefrom, and means actuated by movement of the said cutting tools away from one another for releasing the clamping means from the sheet.

14. In a machine for cutting discs from sheets or plates of glass and the like, a table for horizontally supporting the sheet to be cut having an opening therein, cutting units arranged above and beneath said table including vertically aligned shafts and cutting tools carried by said shafts and disposed in vertical alignment with one another and also in line with said opening, means connecting the cutting units together, means for simultaneously rotating said shafts to move said cutting tools through circular paths, means for clamping the sheet in place upon said table, means for moving said cutting tools away from one another to permit the positioning of the glass sheet between said cutting tools or its removal therefrom, and means actuated by movement of the said cutting tools away from one another for releasing the clamping means from the sheet.

15. In a machine for cutting discs from sheets or plates of glass and the like, means for supporting the sheet to be cut in a horizontal position, cutting units mounted above and beneath said supporting means including cutting tools adapted to engage opposite surfaces of the sheet and disposed in vertical alignment with one another, means for rotating said cutting tools simultaneously through circular paths, a clamping member for clamping the sheet in place upon said supporting means, vertical rods for supporting said clamping member at their lower ends, means under the control of an operator for moving the cutting tools away from one another to permit the sheet to be positioned between said cutting tools or removed therefrom, and means actuated upon moving of the cutting tools away from one another for raising said rods to lift the clamping member from the sheet.

16. In a machine for cutting discs from sheets or plates of glass and the like, means for supporting the sheet to be cut in a horizontal position, cutting units mounted above and beneath said supporting means including cutting tools adapted to engage opposite surfaces of the sheet and disposed in vertical alignment with one another, means for rotating said cutting tools simultaneously through circular paths, a clamping member for clamping the sheet in place upon said supporting means, vertical rods for supporting said clamping member at their lower ends, means under the control of an operator for moving the cutting tools away from one another to permit the sheet to be positioned between said cutting tools or removed therefrom, means actuated upon moving of the cutting tools away from one another for raising said rods to lift the clamping member from the sheet, and means for automatically returning the cutting tools and clamping member to operative position upon the release of the cutting tool separating means by the operator.

EDWARD M. WORDEN.